Feb. 13, 1962 W. I. McLAUGHLIN 3,020,927
THREE-AND FOUR-WAY SLIDING BLOCK VALVE
Filed Jan. 9, 1961 3 Sheets-Sheet 1

WILLIAM I. McLAUGHLIN
INVENTOR.

BY

Feb. 13, 1962 W. I. McLAUGHLIN 3,020,927
THREE-AND FOUR-WAY SLIDING BLOCK VALVE
Filed Jan. 9, 1961 3 Sheets-Sheet 2

INVENTOR.
WILLIAM I. McLAUGHLIN
BY
atty

Feb. 13, 1962 W. I. McLAUGHLIN 3,020,927
THREE-AND FOUR-WAY SLIDING BLOCK VALVE
Filed Jan. 9, 1961 3 Sheets-Sheet 3

INVENTOR.
WILLIAM I. McLAUGHLIN
BY

United States Patent Office

3,020,927
Patented Feb. 13, 1962

1

3,020,927
THREE- AND FOUR-WAY SLIDING BLOCK VALVE
William I. McLaughlin, 245 Cumberland Lane,
Crystal Lake, Ill.
Filed Jan. 9, 1961, Ser. No. 81,652
17 Claims. (Cl. 137—622)

My invention relates to a three- and four-way sliding block valve for hydraulic or pneumatic systems.

While three- and four-way valves are well known in a multitude of forms, the valve of my invention, by virtue of its novel construction, incorporates a number of advantages over those hitherto known.

My valve is characterized by extremely light pressure of operation on the order of a third or less of the pressure required for comparable valves.

My valve is inexpensive, being characterized by great simplicity of parts, construction and operation and by minimum requirements of accuracy in its parts.

My valve is exceedingly compact and highly versatile, and usable in a wide variety of applications. Other objects and advantages of my invention will be apparent from the following description and drawings of which:

Figure 1:
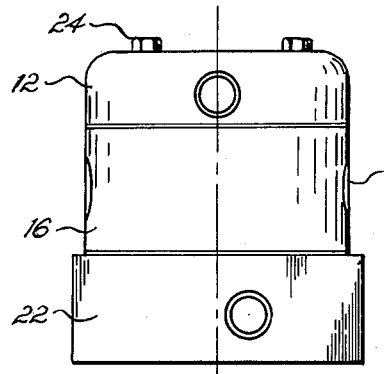
FIG. 1 is a side elevation of a valve embodying my invention.
Figure 2:
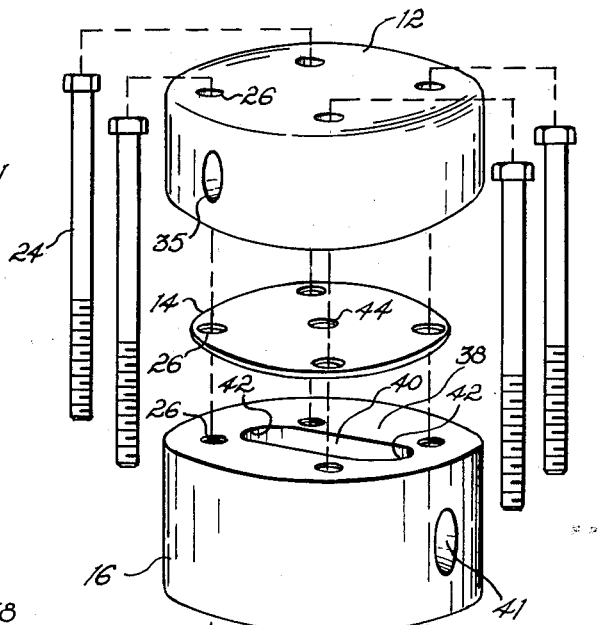
FIG. 2 is an exploded perspective view thereof showing the separate component parts.
Figure 3:
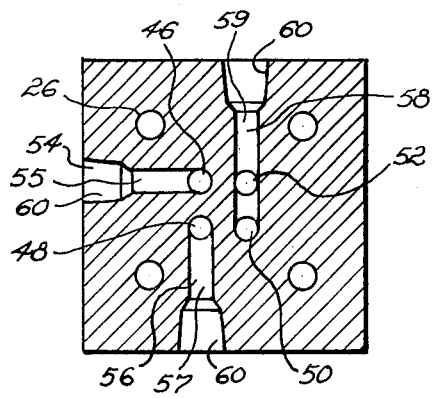
FIG. 3 is a central horizontal section through the base of my valve taken substantially along the line 3—3 of FIG. 2 looking in the direction of the arrows.
Figure 4:
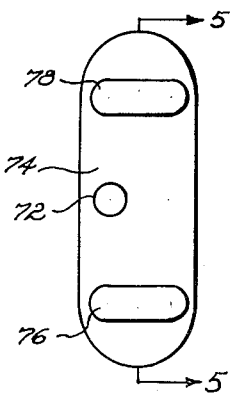
FIG. 4 is a bottom plan view of the block.

The embodiment of my valve illustrated in FIGS. 1 through 9 consists of a cap 12, a top pressure plate 14, a body 16, a sliding block 18, a bottom pressure plate 20 and a base 22, together with bolts 24 extending through appropriate bores 26 in all parts except the sliding block to secure the members together in stacked relation.

I have illustrated the cap and body as being cylindrical and mounted to a square base but it will be evident that the exterior configuration of these parts plays no part in my invention.

Figure 7:
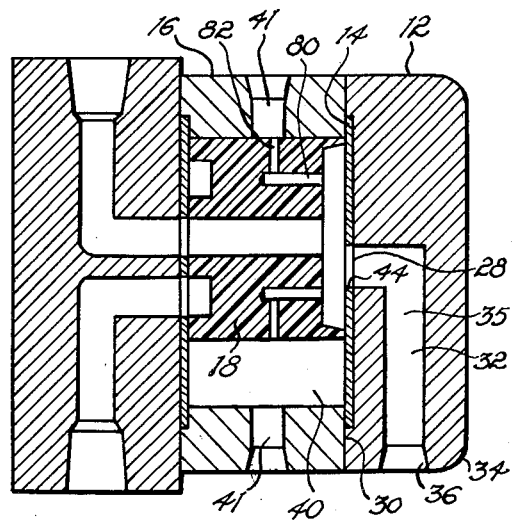
FIG. 7 is a central section through the valve taken substantially along the line 7—7 of section 6 looking in the direction of the arrows, showing however the cap and top pressure plate in place.

Referring particularly to FIG. 7, the cap is a flat relatively thick cylindrical plate having a bore 28 extending from the center of the inside face 30 thereof to the center thereof and an intersecting bore 32 extending to the cylindrical periphery 34 thereof, bores 28 and 32 defining an inlet duct 35. Where bore 32 opens on to the periphery a receptacle 36 for a pressure line will be provided.

The body is a relatively deep cylindrical member hav-

2 ing an elongated slot 40 therethrough with generally semi-circular ends 42. The body likewise will have bores or operating ports 41 extending from the periphery thereof to the semicircular slot ends 42. The body and the cap have circular shallow recesses 38 formed in their bottom surfaces to receive the top and bottom pressure plates 14 and 20. These pressure plates are circular members formed desirably of Teflon or some similar material having equivalent anti-friction surface characteristics. The recesses should be just shallow enough or somewhat less than shallow enough to accommodate the top and bottom pressure plates. The top pressure plate 14 has a central hole 44 arranged to register with the bore 28 in the cap 12.

The base has four bores constituting ports 46, 48, 50 and 52 extending through the inside surface thereof to about the vertical center of the base block 22 equally spaced in a square about the center of the base. Intersecting bores extend from the periphery of the base block in the central horizontal plane thereof to meet the ports 46, 48, 50 and 52. Bore 54 meets port 46 to define a first reversible flow duct 55. Bore 56 meets port 48 to define a second reversible flow duct 57. Bore 58 intersects both ports 50 and 52 to define an exhaust duct 59. All of the bores 54, 56 and 58 are formed at their outer ends 60 for the reception of pressure fittings.

The bottom pressure plate is likewise a circular Teflon sheet having, in addition to the bolt holes 26 therein, four ports 62 which register with the ports 46, 48, 50 and 52 in the base 22.

The sliding block 18 is desirably formed of some such slightly deformable material as polyethylene which likewise has good anti-friction characteristics, good resistance to abrasion and high resistance to hydrocarbons. The block 18 has plane sides 64 and semicircular ends 66, the sides and ends conforming to the sides and ends of slot 40 in the body. The width of the block should be such as to fit the slot closely and the height is desirably slightly greater than the distance between the pressure plates in the assembled valve. The block is appreciably shorter than the slot so as to be movable within the slot between its ends. The top face of the block is dished or has a shallow depression 68 therein surrounded by relatively thin tapering edge walls 70. The block has a hole 72 extending through it from the top to the bottom surface 74. The hole 72 is centered between the ends of the block but is offset to the side of the longitudinal axis of the block to register with either ports 48 or 46 in the base 22, depending on which end of the body slot 40 it may occupy.

The bottom surface 74 of the block has, in addition to the opening of the hole 72 therein, two transverse grooves 76 and 78 therein with closed ends on either side of the opening of hole 72. These grooves are long enough to span two of the ports 46 and 52 or 48 and 50 in the base and are spaced from the hole 72 a distance such that when hole 72 is in register with port 48, groove 78 will overlie ports 46 and 52 and when hole 72 is in register with port 46, groove 76 will overlie ports 48 and 50.

Figure 5:
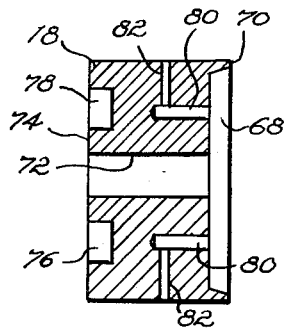
FIG. 5 is a central section through the block taken substantially along the line 5—5 of FIG. 4 looking in the direction of the arrows.

In FIG. 5 I show a block intended for use with a pilot bleed system of actuation. The block in this modification has essentially the same surface characteristics as that shown in FIG. 5. In this modification however, bores 80 are extended from the floor of the depression 68 about half way into the block and two small passages 82 extend in from the center of the ends of the block to intersect the bores 80 to define pressure bleed passages.

In operation, a source of air or liquid under pressure is connected to the inlet duct 35 in the cap 12. Pressure is delivered through that duct and the central hole 44 in the top pressure plate to communicate with the depression 68 in the top of the block 66. The block has a height exactly equal to or slightly in excess of the distance between the top and bottom pressure plates 14 and 20 so that the rim 70 of the depression is firmly in engagement with the top pressure plate. The sides of the rim will be blown out forcibly against the sides of the slot 40 by the admitted pneumatic or hydraulic pressure.

Assuming that the valve is to be used to operate a double acting cylinder, the ends of the cylinder will be connected to reversible flow ducts 55 and 57. Let it also be assumed that pilot bleed valves will be connected to the ducts 41 to operate the valve.

Figure 6:
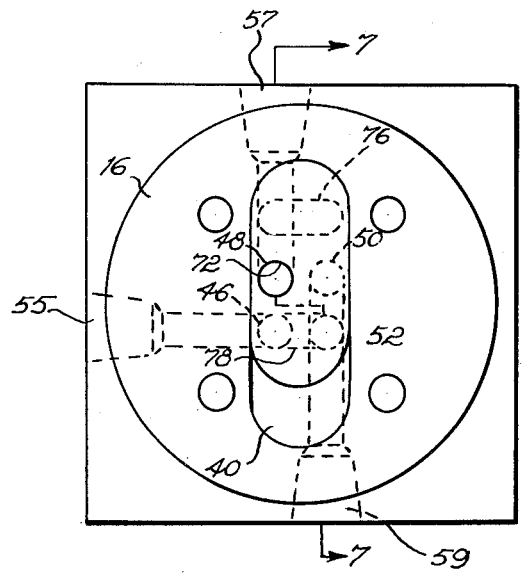
FIG. 6 is a top plan view of the valve shown with the cap and top pressure plate removed.
Figure 8:
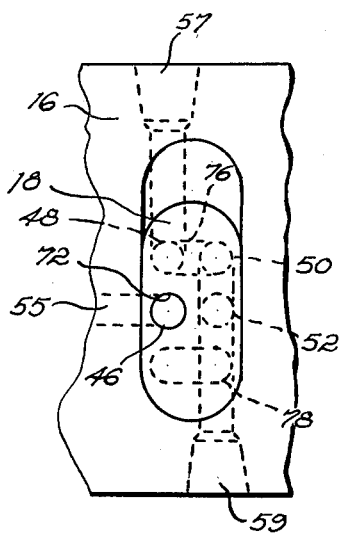
FIG. 8 is a view of the central portion of FIG. 6 showing, however, the sliding block in a different position.

Assuming the valve to be in the condition illustrated in FIG. 6, the hydraulic or pneumatic fluid will flow through hole 72 in the block 66 and into port 48 of the second reversible flow duct 57 and thence into the head end, for example, of the cylinder. The fluid in the rod end of the cylinder, connected to the first reversible flow duct 55 will flow through that duct and up through port 46 to the surface of the base 22. From this point the fluid flows through the slot 78 in the bottom face of the block 66 which bridges ports 46 and 52. Port 52 is in communication with the exhaust duct 59 and the fluid therefore exhausts out of that duct to reservoir or to atmosphere as the case may be.

Figure 9:
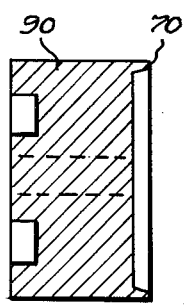
FIG. 9 is a section similar to FIG. 5 showing an alternative form of block.
Figure 13:
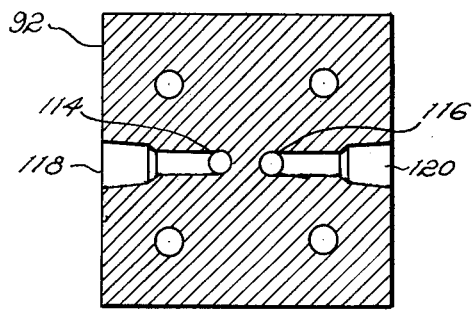
FIG. 13 is a section through the base of the block taken substantially along the line 13—13 of FIG. 10 looking in the direction of the arrows.
Figure 11:
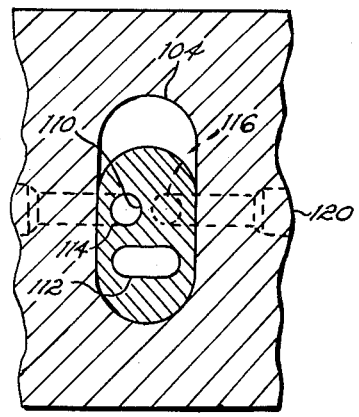
FIG. 11 is a section of the valve of FIG. 10 taken along the line 11—11 of FIG. 10 looking in the direction of the arrows.
Figure 10:
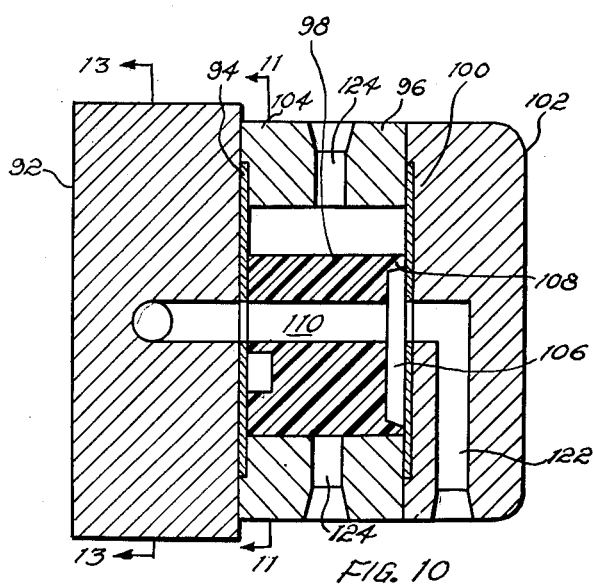
FIG. 10 is a central section through a three-way form of my valve comparable to FIG. 7.
Figure 12:
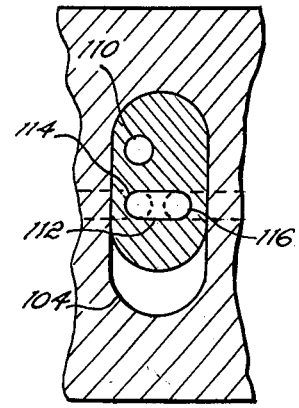
FIG. 12 is a view similar to FIG. 11 with the block shown in the other of its positions.

To reverse the operation of the cylinder a pilot bleed valve, not illustrated, connected to the bottom control passage 41 (FIG. 7) will be opened to relieve the pressure in the chamber existing between the lower end of the slot 40 and the block 18. Line pressure however exists at the upper end of the block by virtue of the pressure communication thereto through the control passages 80—82. This imbalance of pressure will cause the block to shift downward to the lower end of the slot 40 and take the position illustrated in FIG. 8. In this position the fluid under pressure again will be admitted through hole 72 in the block 18 which is now in register with port 46 of the first reversible flow duct 55. Fluid will thus flow to the rod end of the cylinder. The head end of the cylinder, connected to the second reversible flow duct 57 will have its fluid exhausted through the duct 57 to port 78 which opens to the top face of the base 22. The fluid will then flow through slot 76 in the block 18 which now has been brought to interconnect ports 48 and 50. Port 50 is connected to the exhaust duct 59 and the fluid is thus exhausted to reservoir or atmosphere.

Where pilot pressure is to be used for the operation of my valve the block 90 illustrated in FIG. 9 will be used. This block is identical in all respects with that illustrated in FIG. 5 except that it lacks the passages 80 and 82. For pilot pressure operation, controlling pressure will be admitted through the apropriate port 41—41 in the body 16 to force the block to one end of the slot 40 or the other. For mechanical operation, push rods may be inserted in the ports 41 to move the block in either direction. Many other methods of block control will be readily evident.

The above described valve may likewise be used for three-way operation, as where one end of a cylinder is to have pressure applied thereto and vented therefrom. One of the reversible flow ducts 55 and 57 will be plugged and the remaining one connected to the operating port of the cylinder. Reciprocation of the block to one position will result in admission of pressure into the cylinder. The movement of the block to the other position will direct the pressure to the plugged reversible flow duct and will open the cylinder to exhaust through the appropriate cross slot 76 or 78 in the bottom of the block.

The embodiment of my invention illustrated in FIGS. 10 through 13 is a valve designed for three-way operation. This embodiment of my invention as illustrated likewise includes a base 92, a bottom pressure plate 94, a body 96, a sliding block 98, a top pressure plate 100 and a cap 102, together with bolts, not illustrated but similar to bolts 24 in the first described embodiment, to secure the assembly together in stacked relation. In this embodiment of my invention the cap 102 and the top pressure plate 100 may be substantially the same as described before. The body 96 is also substantially similar to the body 16 of the first described form except that the block-containing slot 104 will be somewhat shorter. The block itself likewise is shorter than the block of the first described form, made possible by certain modification in structure.

The block 98 has a depression 106 in its top surface surrounded by thin tapering walls 108 as in the first described form, and a hole 110 extends through the block from the depression to the bottom surface. The underside of the block has a transverse groove 112 formed therein with closed ends. The base of the block has a pair of ports 114 and 116 therein which communicate with the inner end of opposite passages 118 and 120 bored into the sides of the base and adapted for pressure fittings. Passage 118 may be regarded as a two-way flow passage to be connected to one end of a hydraulic or pneumatic cylinder and passage 120 may be regarded as an exhaust passage. The bottom pressure plate 94 will have holes therein to register with the ports 114 and 116. The two ports lie on a central transverse axis of the base.

The body 96 of the illustrated valve is attached to the base 92 with the long axis of the slot 104 therein at right angles to the line of the ports 114 and 116. The hole 110 through the block and the slot 112 in the bottom surface thereof are situated on either side of the transverse center line of the block. Additionally the hole is displaced away from the longitudinal center line of the block so as to be movable into registry with port 114.

The operation of this modification of my valve is much the same as described before. The pressure inlet passage 122 in the cap is connected to a source of fluid under pressure and pressure is thereby delivered to the depression 106 on the top of the block and thence into the hole 110 through the block. Passage 118 is connected to, for instance, the head end of a cylinder having a resilient plunger return. Passage 120 may be open to the atmosphere or connected to the reservoir in the case of a hydraulic application. The illustrated passage 124 in the body 96 may be used to move the block 98 from one end of the slot to the other as by mechanical or pneumatic means, etc. Movement of the block to the position illustrated in FIG. 11 places hole 110 in registry with port 114 and thereby delivers the fluid under pressure to the cylinder. Movement of the block to the position illustrated in FIG. 12 removes the hole 110 from registry with the port 114, and the pressure plate 94 blocks off fluid flow through the hole. At the same time the ends of the slot 112 is brought into registry with the ports 114 and 116 so that the slot constitutes a bridge passage between these ports. The fluid in the cylinder may therefore flow from the cylinders through the two-way flow passage 118 into slot 112 and out the exhaust passage 120.

From the foregoing description it will be appreciated that I have invented a valve of singular simplicity which operates efficiently and far more easily than other valves I have encountered. I attribute the success of the valve to the novel arrangement of ports and passages. The ease of operation of the valve of my invention derives largely from the polyethylene block which slides smoothly in the slot but seals tightly against the slot sides by virtue of the thin edge walls 70 which are forced out against the sides of the slot in fluid-tight relation therewith. The semicircular ends have excellent fluid retention because of their arcuate shape.

I likewise attribute the ease of operation to the use of the Teflon pressure plates and in combination with the polyethylene block. The anti-friction characteristics of Teflon are well known, but the particular choice of materials in the context of a three- or four-way valve operable by exceedingly low pressure is believed entirely novel. Other materials, of course, may be substituted for the Teflon and polyethylene. New materials have been developed which may have superior characteristics in those areas relevant to my invention and other superior materials will undoubtedly appear in the future. At the present time, however, these materials are a singularly successful combination, incorporating the desired anti-friction characteristics and a slight flexibility which makes possible the pressure seal of the block to the walls of the slot and against the pressure plates.

It will be further appreciated that alternatives both as to form and structure lie within the purview of my invention, and I therefore desire that my invention be regarded as being limited only as set forth in the following claims.

I claim:

1. A three- and four-way valve comprising a body member having a slot therein, a block shorter than said slot mounted in said slot for movement between two positions, said block having a hole therethrough, means providing a duct in communication with said hole for delivering fluid under pressure to one side of said block, a member having a first reversible flow duct therein, said duct having a port in register with said hole on the other side of said block in one of said positions of said block, said member having a second reversible flow duct having a port in register with said hole in the other position of said block, said member also having an exhaust duct therein having a port opening against the said block away from the line of movement of said hole, said block having bridging passages formed therein to connect said second reversible flow port to said exhaust port when said hole is in register with said first reversible flow port and connect said first reversible flow port with said exhaust port when said hole is in register with said second reversible flow port.

2. A three- and four-way valve comprising a body member having a slot therein, a block shorter than said slot and contained in said slot for movement between two positions, said block having a hole therethrough, means secured against one side of said body providing a duct for delivering fluid under pressure to the top side of said block in communication with said hole, a member secured against the other side of said body, said member having a first reversible flow duct, a second reversible flow duct and an exhaust duct formed therein, each of said ducts having a port opening on the surface of said member adjacent said body, said block having bridging grooves formed on the bottom sides thereof, said first reversible flow port being positioned on said member to be in register with said hole when said block is in one of said positions and said second reversible flow port being positioned on said member to be in register with said hole is in the other of said positions and said exhaust port being positioned under said block away from said hole, said bridging grooves providing a passage between said second reversible flow port and said exhaust port when said block is in said one position and providing a passage between first reversible flow port and said exhaust port when said block is in said other position.

3. The combination as set forth in claim 2 wherein said block is formed of a material having the characteristics of polyethylene.

4. The combination as set forth in claim 2 wherein said block has a shallow recess formed in the top surface thereof into which said hole opens extending substantially over said entire surface.

5. The combination as set forth in claim 2 wherein said block is formed of slightly resilient material and has a depression formed in the top surface thereof into which said hole opens, said depression being bounded by thin walls.

6. The combination as set forth in claim 5 wherein said block includes additionally pilot bleed holes extending from said depression to the ends of said block and said body has apertures therein extending between the exterior thereof and the ends of said slot.

7. The combination as set forth in claim 2 including additionally sheets on each side of said slot having the general characteristics of Teflon, said sheet on the top side of said body having an aperture therein in alignment with said fluid delivery duct and the sheet on the bottom side of said body having apertures therein in alignment with said ports and said block is formed of a material having the general characteristics of polyethylene.

8. The combination as set forth in claim 7 wherein said block has a slightly greater height than the depth of said slot.

9. A three- and four-way valve comprising a body member having parallel surfaces and a slot extending between said surfaces, a polyethylene block shorter than said slot mounted in said slot for movement between two positions, said block having a shallow depression in the top surface thereof and a hole therethrough extending from said depression to the bottom surface thereof, a cap secured against the top surface of said body and having a duct therethrough for the delivery of fluid under pressure to said depression, a base secured against the bottom surface of said body, said base having a first reversible flow duct having a port in the surface of said base adjacent said body in alignment with said hole when said block is in one of said positions, a second reversible flow duct having a port in said base surface in alignment with said hole when said block is in the other of said positions, an exhaust duct having a pair of ports in said surface of said base transversely opposite said reversible flow ports out of the line of movement of said hole, said block having transverse grooves with closed ends formed in the bottom surfaces thereof, one of said grooves providing a passage interconnecting said second reversible flow port with its opposite exhaust port when said hole is in alignment with said first reversible flow port and the other of said grooves providing a passage between said first reversible flow port and its opposite exhaust port when said hole is in alignment with said second reversible flow port.

10. The combination as set forth in claim 9 including additionally Teflon gaskets interposed between said cap and said body and said body and said base.

11. A fluid control valve comprising a body member having a slot therein, a block shorter than said slot mounted in said slot for movement between two positions, said block having a hole therethrough, means providing a duct in communication with said hole for delivering fluid under pressure to one side of said block, a member having a reversible flow duct therein, said duct having a port in register with said hole on the other side of said block in one of said positions of said block, said member also having an exhaust duct therein having a port opening against said block away from the line of movement of said hole, said block having a bridging passage formed therein to connect said reversible flow port to said exhaust port when said block is in said other position.

12. The combination as set forth in claim 11 wherein said block has a height at least equal to the depth of said slot and is formed of a material having the characteristics of polyethylene.

13. The combination as set forth in claim 12 wherein said block has a shallow depression therein in constant communication with said fluid delivery duct over the range of block movement into which said hole opens.

14. The combination as set forth in claim 13 wherein said depression is bounded by thin resilient parallel side walls and arcuate end walls.

15. The combination as set forth in claim 12 including additionally sheets on each side of said slot having the general characteristics of Teflon, the sheet between said body and said fluid delivery means having an aperture therein in alignment with said duct and the sheet between said body and said member having openings therein in alignment with said ports.

16. A fluid flow control valve comprising a body member having parallel surfaces and a slot extending between said surfaces, a block shorter than said slot and having a height at least equal to the depth of said slot mounted in said slot for movement between two positions, said block having a hole therethrough extending from the top surface to the bottom surface thereof, a cap secured against the top surface of said body and having a duct therethrough for the delivery of fluid under pressure to said hole, a base secured against the bottom surface of said body said base having a reversible flow duct with a port in the surface of said base adjacent said body in alignment with said hole when said block is in one of said positions and an exhaust duct having a port in said surface of said base transversely opposite said reversible flow port out of the line of movement of said hole, said block having a transverse groove with closed ends formed in the bottom surface thereof providing a passage interconnecting said reversible flow port with said exhaust port when said block is in said other position.

17. A fluid flow control valve comprising a body member having parallel surfaces and a slot extending between said surfaces, a block shorter than said slot and having a height at least equal to the depth of said slot mounted in said slot for movement between two positions, said block having a hole therethrough extending from the top surface to the bottom surface thereof, a cap secured against the top surface of said body and having a duct therethrough for the delivery of fluid under pressure to said hole, a base secured against the bottom surface of said body said base having a reversible flow duct with a port in the surface of said base adjacent said body in alignment with said hole when said block is in one of said positions and out of alignment with said hole when said block is in the other position and an exhaust duct having a port in said surface of said base transversely opposite said reversible flow port out of the line of movement of said hole, said block having a transverse groove with closed ends formed in the bottom surface thereof providing a passage interconnecting said reversible flow port with said exhaust port when said block is in said other position.

References Cited in the file of this patent

UNITED STATES PATENTS

| 2,633,103 | Oliver | Mar. 31, 1953 |
| 2,951,505 | Hare | Sept. 6, 1960 |

FOREIGN PATENTS

| 507,353 | Canada | Nov. 16, 1954 |